(12) United States Patent
Sugisawa (10) Patent No.: US 10,483,062 B2
(45) Date of Patent: Nov. 19, 2019

(54) ELECTRIC WIRE PROTECTION DEVICE (71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Yuuki Sugisawa, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

(*) Notice: Subject to any disclaimer, the term of this patent is extended or adjusted under 35 U.S.C. 154(b) by 41 days.

(21) Appl. No.: 15/752,979

(22) PCT Filed: Aug. 8, 2016

(86) PCT No.: PCT/JP2016/073306
§ 371 (c)(1),
(2) Date: Feb. 15, 2018

(87) PCT Pub. No.: WO2017/030035
PCT Pub. Date: Feb. 23, 2017

(65) Prior Publication Data
US 2018/0248354 A1 Aug. 30, 2018

(30) Foreign Application Priority Data
Aug. 20, 2015 (JP) ................................ 2015-162965

(51) Int. Cl.
*H01H 39/00* (2006.01)
*H02H 3/04* (2006.01)
(Continued)

(52) U.S. Cl.
CPC .......... *H01H 39/006* (2013.01); *B60R 16/02* (2013.01); *H01H 37/002* (2013.01); *H02H 3/04* (2013.01);
(Continued)

(58) Field of Classification Search
CPC ................ H01H 39/00; H01H 39/006; H01H 2039/008; H02H 3/04; H02H 3/085;
(Continued)

(56) References Cited

U.S. PATENT DOCUMENTS 5,207,276 A * 5/1993 Scofield ................. A62C 3/006
169/61
5,877,563 A * 3/1999 Krappel ............... H01H 39/006
180/271

(Continued)

FOREIGN PATENT DOCUMENTS

| JP | H08-205411 A | 8/1996 |
| JP | 2002-238135 A | 8/2002 |

(Continued)

OTHER PUBLICATIONS

Search Report for PCT/JP2016/073306, dated Oct. 4, 2016.

*Primary Examiner* — Ronald W Leja
*Assistant Examiner* — Christopher J Clark
(74) *Attorney, Agent, or Firm* — Honigman LLP (57) ABSTRACT

An electric wire protection device comprising a pyrotechnic cutoff switch disposed between an electric wire connecting a load and a vehicle-mounted power supply that is connected to a reference potential. The pyrotechnic cutoff switch is disposed between the electric wire and has: a conductive part through which current between the vehicle-mounted power supply and the load flows; a cutting blade cuts the conductive part; a drive part, actuated by gunpowder, propels the cutting blade in a direction in which the conductive (Continued)

part is to be cut; and first and second terminals that input and output current that drives the drive part. In addition, the electric wire protection device comprises: a conductive wire having one end thereof connected to the electric wire and the other end thereof connected to the first terminal; and a diode having an anode connected to the reference potential and a cathode connected to the second terminal.

18 Claims, 4 Drawing Sheets

(51) Int. Cl.
| | |
|---|---|
| H02H 3/087 | (2006.01) |
| H02H 5/04 | (2006.01) |
| B60R 16/02 | (2006.01) |
| H02J 7/00 | (2006.01) |
| H01H 37/00 | (2006.01) |

(52) U.S. Cl.
CPC ............. *H02H 3/087* (2013.01); *H02H 5/04* (2013.01); *H02H 5/041* (2013.01); *H02J 7/0029* (2013.01); *H02J 2007/0039* (2013.01)

(58) Field of Classification Search
CPC ........... H02H 3/087; H02H 3/18; H02H 5/04; H02H 5/041; H02J 7/0029–0036; H02J 2007/0037–004
See application file for complete search history.

(56) References Cited

U.S. PATENT DOCUMENTS

| | | | | |
|---|---|---|---|---|
| 5,990,572 | A * | 11/1999 | Yasukuni | H01H 39/006 180/271 |
| 6,295,930 | B1 * | 10/2001 | Kume | H01H 39/006 102/202.5 |
| 8,716,615 | B2 * | 5/2014 | Fukuyama | H01H 39/006 200/61.08 |
| 8,918,222 | B2 * | 12/2014 | Higuchi | H02J 7/0031 323/284 |
| 2002/0018331 | A1 * | 2/2002 | Takahashi | H01H 39/00 361/103 |
| 2006/0232901 | A1 * | 10/2006 | Bierbaum | H02H 7/18 361/93.1 |
| 2010/0172061 | A1 * | 7/2010 | Gronwald | H01H 39/006 361/84 |
| 2010/0328014 | A1 * | 12/2010 | Suzuki | H01H 9/12 337/30 |
| 2013/0154352 | A1 * | 6/2013 | Tokarz | B60L 3/0046 307/9.1 |
| 2015/0043115 | A1 * | 2/2015 | Ahmed | H02H 3/02 361/71 |
| 2015/0116883 | A1 * | 4/2015 | Kimoto | B60R 16/02 361/103 |
| 2017/0330714 | A1 * | 11/2017 | von zur Muehlen | H01H 39/00 |
| 2017/0330715 | A1 * | 11/2017 | von zur Muehlen | H01H 9/30 |

FOREIGN PATENT DOCUMENTS

| | | |
|---|---|---|
| JP | 2007-014165 A | 1/2007 |
| JP | 2012-253222 A | 12/2012 |
| JP | 2014-054115 A | 3/2014 |
| WO | WO-2013115112 A1 * | 8/2013 ............. B60R 16/02 |

* cited by examiner

ELECTRIC WIRE PROTECTION DEVICE

CROSS-REFERENCE TO RELATED APPLICATIONS

This application is the U.S. national stage of PCT/JP2016/073306 filed Aug. 8, 2016, which claims priority of Japanese Patent Application No. JP 2015-162965 filed Aug. 20, 2015.

TECHNICAL FIELD

The present invention relates to an electric wire protection device that prevents an electric wire connecting a vehicle-mounted power supply and a load from being damaged by overcurrent.

BACKGROUND

Loads such as headlights and motors are built into vehicles, and such loads are connected to a vehicle-mounted power supply by electric wires. Electric wires degrade over time due to friction and the like, exposing the core wires inside, which may then come into contact with nearby conductive structures and cause short-circuits. Thermal fuses are typically inserted at appropriate locations of electric wires to prevent the electric wires or loads from being damaged by short-circuits.

However, when loads having high inrush current, such as headlamps, are repeatedly energized, thermal fuses tend to degrade, resulting in a shorter weld time. There is thus a problem in that a thermal fuse having a relatively high current capacity must be used, and as a result, an electric wire capable of withstanding a comparatively high current must be used as well.

As a method for solving such a problem, a protection device that estimates the temperature of an electric wire on the basis of a current value and, when the temperature of the electric wire reaches a limit temperature, cuts a conductive path from a vehicle-mounted power supply to a load using a cutoff switch such as a relay has been disclosed (JP 2010-239835A, for example). Specifically, a microcomputer provided in the protection device periodically obtains the current value in the electric wire from a current meter and calculates a value of the rise in the temperature of the electric wire using an expression of a relationship between the obtained current value, the heat generated by the electric wire, and the heat radiated by the electric wire. The temperature of the electric wire is calculated by adding a result of integrating the values of the rise in temperature calculated each time the current value is obtained to the ambient temperature at the start of energizing. When the calculated temperature of the electric wire reaches the limit temperature, the cutoff switch operates and cuts off the conductive path from the vehicle-mounted power supply to the load.

When carrying out maintenance or replacing parts in a vehicle, the vehicle-mounted power supply may be erroneously connected to the load in reverse. If the vehicle-mounted power supply is connected to the load in reverse, reverse overcurrent may flow in the electric wire and damage the electric wire, and thus it is desirable to quickly cut off such overcurrent.

An object of the present invention is to provide an electric wire protection device that can protect an electric wire by instantly cutting off a conductive path when a vehicle-mounted power supply is connected to a load in reverse.

SUMMARY

An electric wire protection device according to one aspect of the present invention includes: a pyrotechnic cutoff switch, provided partway along an electric wire connecting a load to a vehicle-mounted power supply connected to a reference potential, the pyrotechnic cutoff switch including a conductive part that conducts current between the vehicle-mounted power supply and the load, a cutting blade that cuts the conductive part, a drive part that propels the cutting blade in a direction that cuts the conductive part using the explosive power of gunpowder, and two terminals that input and output current that drives the drive part; a conductive wire, one end of the conductive wire being connected to the electric wire and another end of the conductive wire being connected to one of the terminals; and a diode, an anode of the diode being connected to the reference potential and a cathode of the diode being connected to the other of the terminals.

The present invention can be realized not only as an electric wire protection device including such characteristic processing units, but also as an electric wire protection method that takes the characteristic processes as steps, a program for causing a computer to execute such steps, and so on. Additionally, the present invention can be realized as a semiconductor integrated circuit that implements some or all of the electric wire protection device, and as another system that includes the electric wire protection device.

ADVANTAGEOUS EFFECTS OF INVENTION

According to the foregoing, an electric wire protection device that can protect an electric wire by instantly cutting off a conductive path when a vehicle-mounted power supply is connected to a load in reverse can be provided.

DETAILED DESCRIPTION OF PREFERRED EMBODIMENTS

Description of Embodiments of the Present Invention

First, embodiments of the present invention will be described as examples. The embodiments described hereinafter may be at least partially combined as desired.

An electric wire protection device according to one aspect of the present invention includes: a pyrotechnic cutoff switch, provided partway along an electric wire connecting a load to a vehicle-mounted power supply connected to a reference potential, the pyrotechnic cutoff switch including a conductive part that conducts current between the vehicle-mounted power supply and the load, a cutting blade that cuts the conductive part, a drive part that propels the cutting blade in a direction that cuts the conductive part using the explosive power of gunpowder, and two terminals that input and output current that drives the drive part; a conductive wire, one end of the conductive wire being connected to the electric wire and another end of the conductive wire being connected to one of the terminals; and a diode, an anode of the diode being connected to the reference potential and a cathode of the diode being connected to the other of the terminals.

According to this aspect, if the vehicle-mounted power supply is connected to the load in reverse and a potential lower than the reference potential is applied to the electric wire and the load, there is a risk of overcurrent flowing in the electric wire in the reverse direction. When a potential lower than the reference potential is applied to the electric wire, current flows through the diode to the drive part of the pyrotechnic cutoff switch, and the pyrotechnic cutoff switch activates. When the drive part is driven, the conductive part is cut by the cutting blade, and the conductive path between the vehicle-mounted power supply and the load is cut off.

The electric wire protection device according to this aspect has a circuit configuration in which current flows to the drive part immediately when the vehicle-mounted power supply is connected to the load in reverse. Additionally, the pyrotechnic cutoff switch is configured to instantly cut the conductive part using the explosive power of the gunpowder when current flows to the drive part. Accordingly, the conductive path from the vehicle-mounted power supply to the load can be cut off instantly when the vehicle-mounted power supply is connected to the load in reverse, which makes it possible to prevent the electric wire from being damaged by overcurrent.

Preferably, the configuration further includes: a switch, one end of the switch being connected to the other of the terminals and another end of the switch being connected to the reference potential; and a control unit that opens and closes the switch.

According to this aspect, when the switch is closed under the control of the control unit, current flows through the switch to the drive part, and the pyrotechnic cutoff switch activates. When the drive part is driven, the conductive part is cut by the cutting blade, and the conductive path between the vehicle-mounted power supply and the load is cut off. Accordingly, the conductive path can be cut off through active control by the control unit, and the electric wire can be prevented from being damaged by overcurrent.

Preferably, the configuration further includes a current detecting unit that detects current flowing in the electric wire, and the control unit closes the switch in the case where the current detecting unit has detected current flowing from the load toward the vehicle-mounted power supply.

According to this aspect, when the vehicle-mounted power supply is connected to the load in reverse and current flows from the load toward the vehicle-mounted power supply, the control unit closes the switch and cuts off the conductive path between the vehicle-mounted power supply and the load. When the vehicle-mounted power supply is connected to the load in reverse, the pyrotechnic cutoff switch is activated by the current flowing through the diode to the drive part or the current flowing through the switch to the drive part, and the conductive path between the vehicle-mounted power supply and the load is cut off.

Accordingly, even if, for example, the control unit or the diode has malfunctioned, the conductive path from the vehicle-mounted power supply to the load can be cut off when the vehicle-mounted power supply is connected to the load in reverse, which makes it possible to prevent the electric wire from being damaged by overcurrent.

Preferably, the configuration further includes a current detecting unit that detects current flowing in the electric wire, and an obtaining unit that obtains, from the exterior, information of a value of current flowing in the electric wire; and the control unit includes a determining unit that determines whether or not a difference between the value of the current detected by the current detecting unit and the value of the current obtained by the obtaining unit is greater than or equal to a predetermined value, and closes the switch in the case where the determining unit has determined that the difference is greater than or equal to the predetermined value.

According to this aspect, the control unit closes the switch and cuts off the conductive path between the vehicle-mounted power supply and the load if the value of the current detected by the current detecting unit and the value of the current in the electric wire, obtained from the exterior, diverge. Abnormalities in the information of the value of the current flowing in the electric wire indicate the possibility that overcurrent is flowing in the electric wire, and thus the conductive path can be cut off and the electric wire can be preemptively protected.

Preferably, the configuration further includes a current detecting unit that detects current flowing in the electric wire, and a temperature detecting unit that detects a surrounding temperature; and the control unit includes a temperature calculating unit that calculates a temperature of the electric wire on the basis of the value of the current detected by the current detecting unit and the surrounding temperature detected by the temperature detecting unit, includes a comparing unit that compares the temperature calculated by the temperature calculating unit with a threshold, and closes the switch in the case where the temperature is greater than or equal to the threshold.

According to this aspect, the control unit calculates the temperature of the electric wire on the basis of the value of the current detected by the current detecting unit and the surrounding temperature detected by the temperature detecting unit, and closes the switch and cuts off the conductive path between the vehicle-mounted power supply and the load if the calculated temperature is greater than or equal to a threshold. Accordingly, the electric wire can be prevented from being damaged by current that would bring the electric wire to a temperature greater than or equal to the threshold flowing in the electric wire.

Preferably, the configuration is such that the control unit stops the calculation of the temperature in the case where the switch has been closed.

According to this aspect, the control unit stops the process for calculating the temperature of the electric wire when the switch has been closed and the conductive path has been cut off. It is not necessary to calculate the temperature of the electric wire if the conductive path has been cut off, and thus a needless processing load can be eliminated.

Preferably, the configuration further includes: a timer unit that measures a time for which current flows in the electric wire; a remaining lifespan calculating unit that calculates a remaining lifespan of the electric wire on the basis of the temperature calculated by the temperature calculating unit and the time measured by the timer unit; and a remaining lifespan communicating unit that communicates information based on a length of the remaining lifespan calculated by the remaining lifespan calculating unit.

According to this aspect, the remaining lifespan calculating unit calculates the remaining lifespan of the electric wire on the basis of the temperature of the electric wire and an electrification time. The remaining lifespan communicating unit communicates information based on the length of the remaining lifespan obtained through the calculation.

Preferably, the configuration further includes a communicating unit that communicates predetermined information to the exterior in the case where the switch has been closed.

According to this aspect, the communicating unit communicates the predetermined information when the switch has been closed. For example, the communicating unit communicates an indication that the electric wire is protected.

Preferably, the configuration further includes a communicating unit that communicates first predetermined information to the exterior in the case where the value of the current detected by the current detecting unit after the switch has been closed is less than a predetermined current value, and communicates second predetermined information to the exterior in the case where the value of the current is greater than or equal to the predetermined current value.

According to this aspect, the communicating unit communicates the first predetermined information if no current is flowing in the electric wire or current lower than a predetermined current value is flowing in the electric wire after the switch has been closed. For example, the communicating unit communicates an indication that the electric wire is protected.

The communicating unit communicates the second predetermined information if current greater than or equal to the predetermined current value is flowing in the electric wire after the switch has been closed. For example, the communicating unit communicates an indication that the electric wire is not protected due to some abnormality.

Details of Embodiment of Present Invention

A specific example of the electric wire protection system according to an embodiment of the present invention will be described hereinafter will reference to the drawings. Note that the present invention is not intended to be limited to these examples, and is defined instead by the scope of the appended claims All changes that fall within the same essential spirit as the scope of the claims are intended to be included therein as well.

The present invention will be described in detail hereinafter on the basis of drawings illustrating an embodiment thereof.

Figure 1:
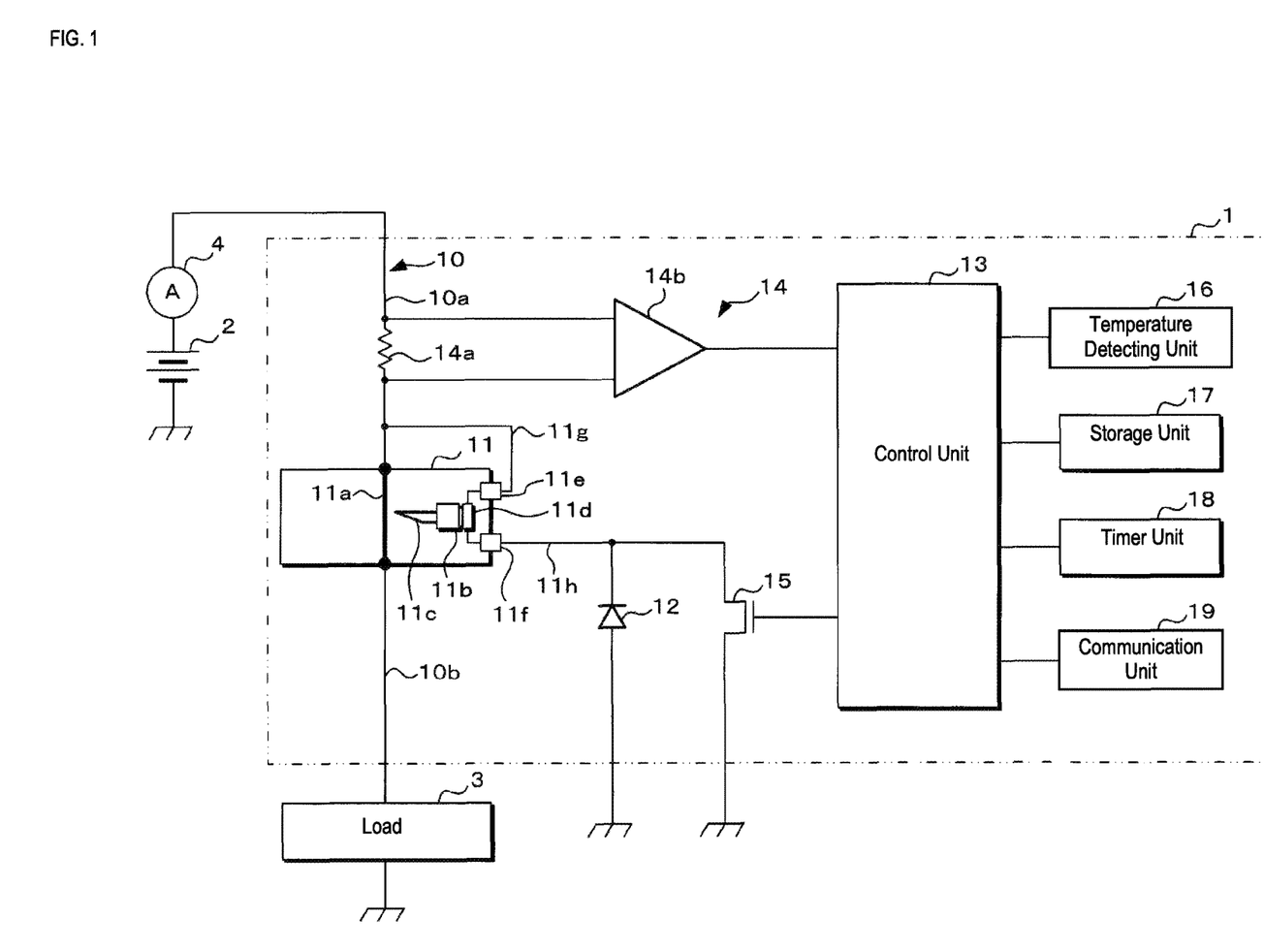
FIG. 1 is a circuit block diagram illustrating an example of the configuration of an electric wire protection system according to an embodiment of the present invention.

FIG. 1 is a circuit block diagram illustrating an example of the configuration of an electric wire protection system according to an embodiment of the present invention. The electric wire protection system according to the present embodiment includes: a vehicle-mounted power supply 2 and a load 3 connected to a reference potential; an electric wire protection device 1 that protects an electric wire 10 connecting the vehicle-mounted power supply 2 and the load 3 from overcurrent; and an external current detecting unit 4, disposed outside the electric wire protection device 1, that detects current flowing in the electric wire 10.

The vehicle-mounted power supply 2 is a lithium-ion battery, for example, and supplies power to the load 3. Note that a lithium-ion battery is one example, and the vehicle-mounted power supply 2 may be constituted by a nickel hydride battery, a capacitor, a lead battery, or another type of capacitor.

The load 3 is a headlight, a windshield wiper, or the like, for example. A positive terminal of the load 3 is connected to a positive terminal of the vehicle-mounted power supply 2 by the electric wire 10, and a negative terminal of the load 3 is connected to the reference potential. The supply of power to the load 3 is controlled by a power supply switch (not illustrated) opening and closing.

The electric wire protection device 1 is provided partway along the electric wire 10, and includes a pyrotechnic cutoff switch 11 that cuts off a conductive path between the vehicle-mounted power supply 2 and the load 3 when the vehicle-mounted power supply 2 is connected in reverse to the load 3 so as to protect the electric wire 10 from overcurrent. The pyrotechnic cutoff switch 11 is provided partway along the electric wire 10, and includes a conductive part 11a, linear in shape, that conducts current between the vehicle-mounted power supply 2 and the load 3. One end of the conductive part 11a is connected to a first electric wire 10a constituting the electric wire 10 on the vehicle-mounted power supply 2 side. Another end of the conductive part 11a is connected to a second electric wire 10b constituting the electric wire 10 on the load 3 side.

The pyrotechnic cutoff switch 11 also includes: a piston part 11b having a cutting blade 11c that cuts the conductive part 11a; a drive part 11d that, using the explosive power of gunpowder, propels the cutting blade 11c in a direction that cuts the conductive part 11a; and a first terminal 11e and a second terminal 11f that input/output current that drives the drive part 11d. The cutting blade 11c is provided on one end of a column-shaped part of the piston part 11b. The piston part 11b supports the cutting blade 11c so as to be capable of moving from a separated position, where the cutting blade 11c is separated from the conductive part 11a, to a cutting position, where the conductive part 11a is cut by the cutting blade 11c. The drive part 11d includes gunpowder disposed at the other end of the column-shaped part constituting the piston, and a detonator for detonating the gunpowder through electrification. The detonator is connected between the first terminal 11e and the second terminal 11f. One end of a conductive wire 11g is connected to the first terminal 11e, and the other end of the conductive wire 11g is connected to the first electric wire 10a. Note that the other end of the conductive wire 11g may be connected to the second electric wire 10b. One end of a conductive wire 11h is connected the second terminal 11f, and the other end of the conductive wire 11h is connected to the cathode of a diode 12 whose anode is connected to a reference potential.

Figure 4:
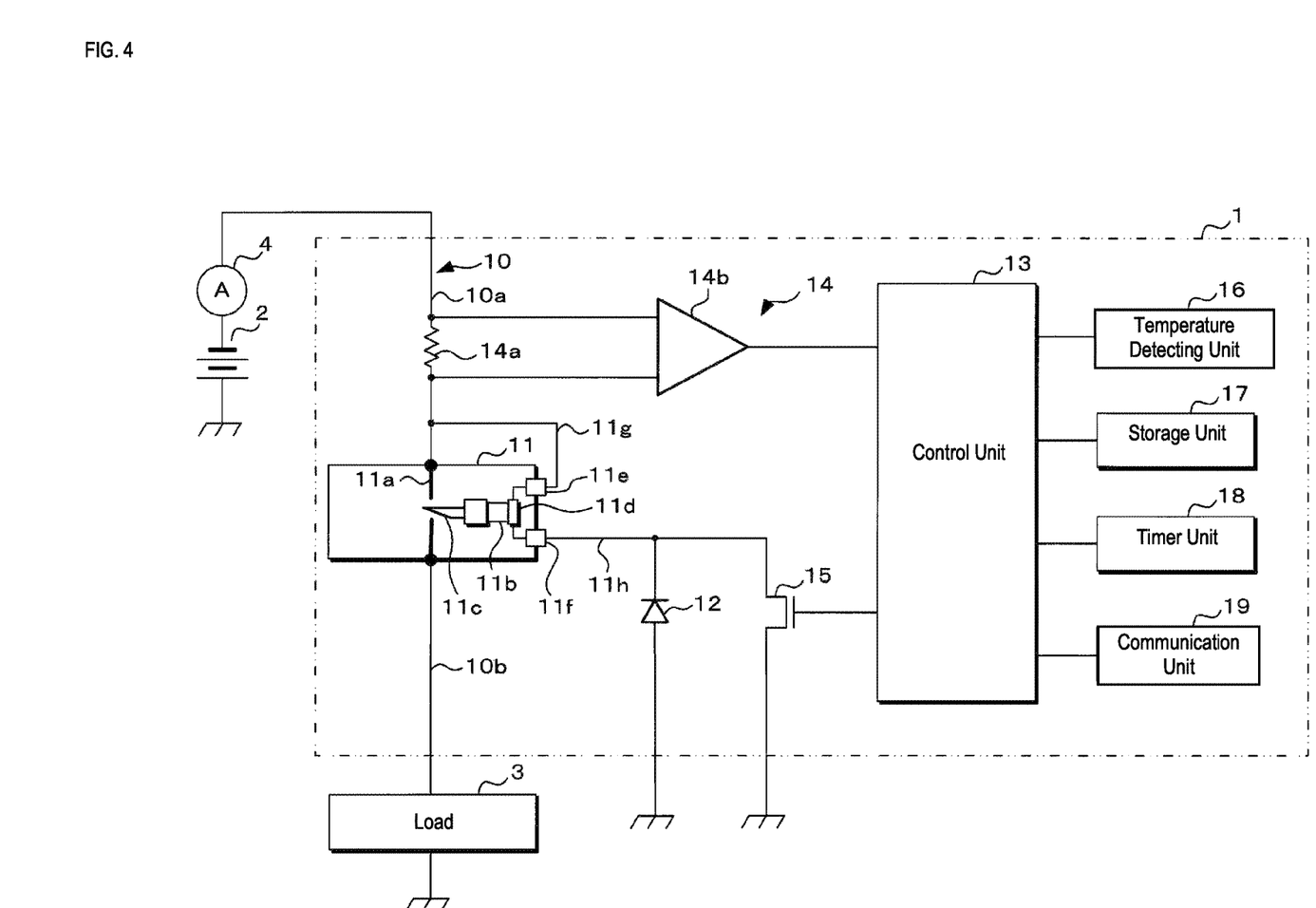
FIG. 4 is a circuit block diagram illustrating a state in which a vehicle-mounted power supply is cut off.

With the electric wire protection device 1 configured in this manner, if a power supply is connected to the electric wire 10 in reverse, i.e. if a voltage lower than the reference potential is applied to the electric wire 10, current flows through the diode 12 to the drive part 11d, the pyrotechnic cutoff switch 11 activates, and the conductive part 11a is cut instantly (see FIG. 4). Cutting off the conductive path between the vehicle-mounted power supply 2 and the load 3 makes it possible to protect the electric wire 10 from being damaged by unanticipated overcurrent.

The electric wire protection device 1 includes a control unit 13 for driving the pyrotechnic cutoff switch 11 and cutting off the conductive path between the vehicle-mounted power supply 2 and the load 3 through another method. The control unit 13 is a microcomputer including a CPU (central processing unit), ROM (read-only memory), RAM (random access memory), input/output interfaces, and so on. A current detecting unit 14, a switch 15, a temperature detecting unit 16, a storage unit 17, a timer unit 18, and a communicating unit 19 are connected to the input/output interfaces of the control unit 13. The external current detecting unit 4 is also connected to the control unit 13 by a signal line (not illustrated).

The current detecting unit 14 includes, for example, a shunt resistor 14a for detecting current flowing between the vehicle-mounted power supply 2 and the load 3, and a comparing circuit 14b that compares voltages at both ends of the shunt resistor 14a and outputs, to the control unit 13, a signal according to the current flowing in the electric wire 10. The control unit 13 obtains digital data indicating a value of the current flowing in the electric wire 10 by AD-converting the signal output from the current detecting unit 14.

The switch 15 is a semiconductor switch such as a MOSFET. One end of the switch 15 is connected to the second terminal 11f of the pyrotechnic cutoff switch 11, and the other end of the switch 15 is connected to the reference potential. A control terminal for controlling the opening/closing of the switch 15 is also connected to the input/output interfaces of the control unit 13, and the switch 15 opens/closes in accordance with a signal output from the control unit 13. Note that if the switch 15 is an N-channel MOSFET, the drain is connected to the second terminal 11f, the source is connected to the reference potential, and the gate is connected to an interface of the control unit 13.

The temperature detecting unit 16 includes a thermistor, for example, and detects the temperature around the electric wire protection device 1 by detecting a voltage in accordance with an electrical resistance value of the thermistor that changes with the surrounding temperature. The control unit 13 obtains digital data indicating a value of the surrounding temperature by AD-converting the signal output from the temperature detecting unit 16.

The storage unit 17 is non-volatile memory such as EEPROM (electrically erasable programmable ROM) or flash memory, and stores a relationship between the temperature of the electric wire 10 and the amount of time by which the lifespan of the electric wire 10 is shortened when electrified for a unit of time at that temperature. As will be described later, the storage unit 17 also stores an initial value of the remaining lifespan of the electric wire 10, and a remaining lifespan of the electric wire 10 calculated by the control unit 13.

The timer unit 18 measures a timing at which to obtain the value of the current in the electric wire 10 from the current detecting unit 14, and supplies a signal communicating that timing to the control unit 13. The control unit 13 is configured to execute a process of calculating the temperature of the electric wire 10, a process of calculating the remaining lifespan of the electric wire 10, and so on every predetermined amount of time, such as 5 ms or 10 ms, and the timer unit 18 supplies the signal to the control unit 13 each time the predetermined amount of time has passed.

The communicating unit 19 is a speaker, a display unit, a warning lamp, or the like. By outputting, to the communicating unit 19, a signal indicating that the electric wire 10 has been protected by the conductive path being cut off, a signal indicating that the power supply is not protected due to some abnormality, a signal indicating that the electric wire 10 has a short remaining lifespan, and so on, the control unit 13 causes the communicating unit 19 to output various types of information using sound, light, or the like.

Note that the communicating unit 19 may be a vehicle LAN communication device connected to an external ECU. The communicating unit 19 sends, to the external ECU, information indicating that the electric wire 10 has been protected, the power supply is not protected due to some abnormality, the electric wire 10 has a short remaining lifespan, and so on under the control of the control unit 13. The external ECU is a control device that controls the operations of the speaker, the display unit, the warning lamp, and so on; the external ECU receives the information sent from the communicating unit 19 and causes that information to be output using sound, light, or the like in accordance with the content of the received information.

A process of cutting off the conductive path under the control of the control unit 13 will be described next.

Figure 2:
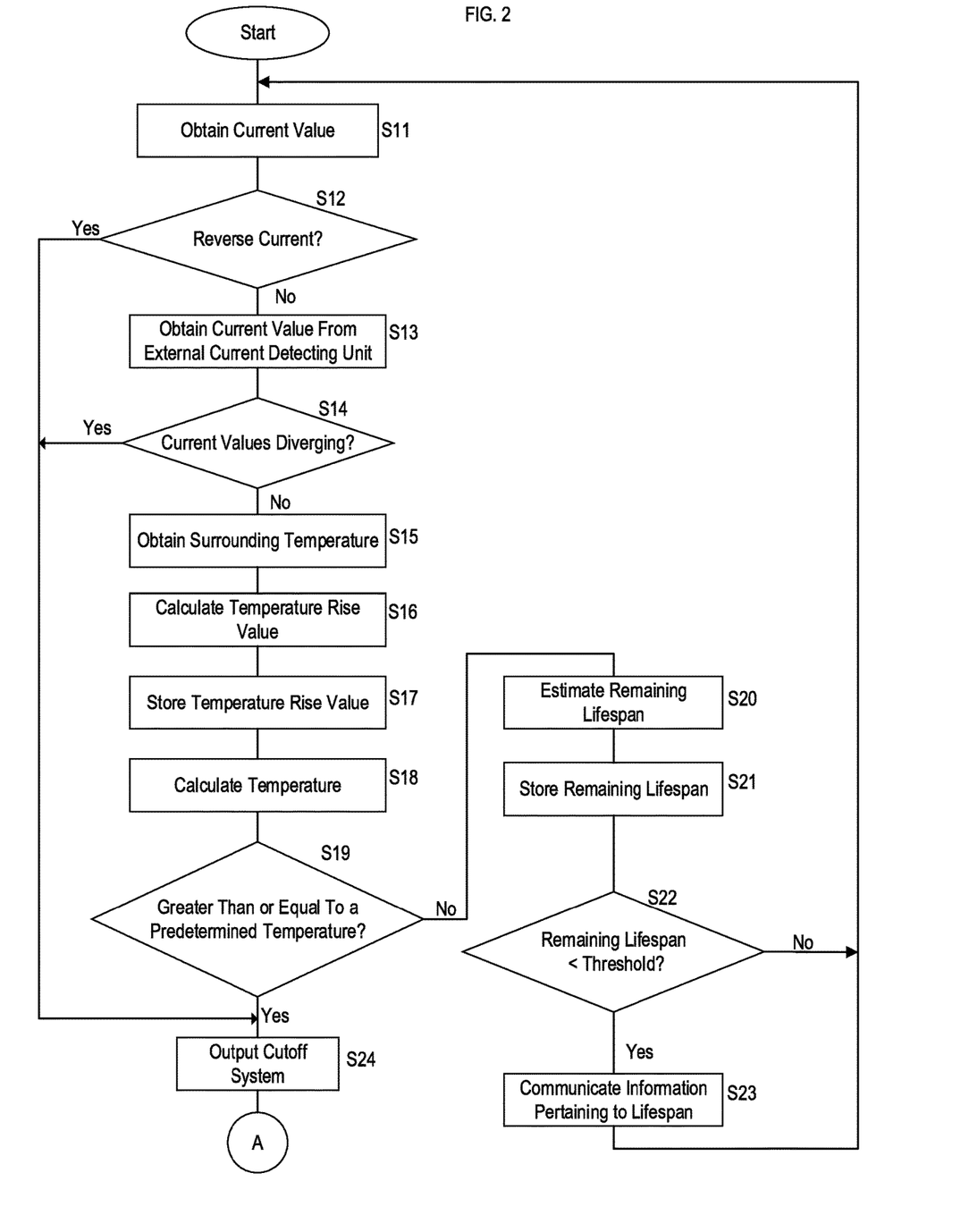
FIG. 2 is a flowchart illustrating a processing sequence carried out by a control unit.
Figure 3:
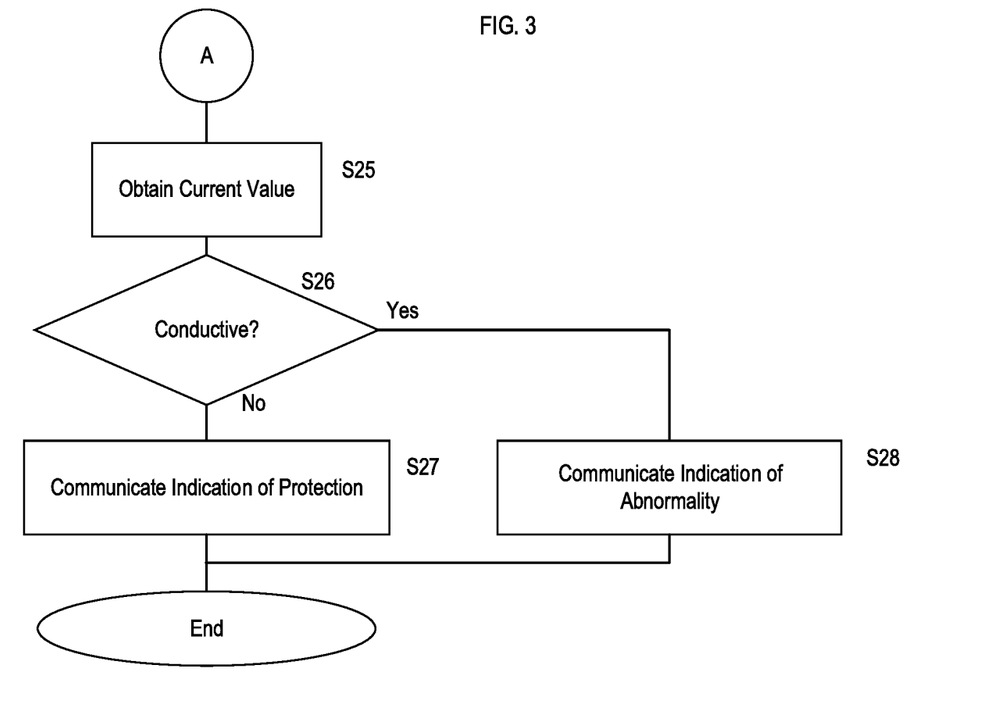
FIG. 3 is a flowchart illustrating a processing sequence carried out by the control unit.

FIGS. 2 and 3 are flowcharts illustrating a processing sequence of the control unit 13, and FIG. 4 is a circuit block diagram illustrating a state in which the vehicle-mounted power supply 2 is cut off. When a signal communicating the timing at which to obtain the current value is input to the control unit 13 from the timer unit 18, the control unit 13 obtains a current value I(n) from the current detecting unit 14 (step S11). Specifically, the current value input to the control unit 13 from the current detecting unit 14 is an analog signal, and the control unit 13 obtains the current value by AD-converting the analog signal. n indicates the timing for obtaining the current value, and is assumed to increase by 1 each time the current value is obtained. For example, I(1) indicates the current value obtained the first time, and I(2) indicates the current value obtained the second time.

Next, the control unit 13 determines whether or not reverse current has arisen on the basis of the obtained current value I(n) (step S12). "Reverse current" refers to current flowing in the direction from the load 3 to the vehicle-mounted power supply 2. Whether or not reverse current has arisen can be determined from whether the current value I(n) is positive or negative. If it is determined that reverse current has not arisen (step S12: NO), the control unit 13 obtains a current value from the external current detecting unit 4 (step S13), and determines whether or not the current value obtained in step S11 and the current value obtained in step S13 are diverging (step S14). For example, the control unit 13 determines that the current values are diverging when a difference between the current values is greater than or equal to a predetermined current value. If it has been determined that the current values are not diverging (step S14: NO), the control unit 13 obtains the surrounding temperature from the temperature detecting unit 16 (step S15). Then, the control unit 13 calculates a temperature rise value of the electric wire 10 using the current value I(n) obtained in step S11 and so on (step S16), stores the calculated temperature rise value (step S17), and calculates the temperature of the electric wire 10 (step S18).

Specifically, the control unit 13 calculates the temperature rise value of the electric wire 10 on the basis of the surrounding temperature detected by the temperature detecting unit 16. When no current is flowing in the electric wire 10, the temperature of the electric wire 10 is the same as the surrounding temperature, but when the electric wire 10 is electrified and produces heat, the temperature of the electric wire 10 becomes higher than the surrounding temperature by an amount equivalent to the temperature rise value. The temperature rise value of the electric wire 10 at the timing of obtaining the current value I(n) is expressed by the following Formula (1), for example.

$$\Delta Tw(n) = \Delta Tw(n-1) \times \exp(-\Delta t / \tau w) + Rthw \times Rw \times I(n-1)^2 \times \{1 - \exp(-\Delta t / \tau w)\} \quad (1)$$

Here, $\Delta Tw(n)$: temperature rise value of the electric wire 10 relative to the surrounding temperature at the nth current value obtainment timing $\tau w$: time constant of the heat generated and the heat radiated by the electric wire 10

$\Delta t$: current value obtainment period

Rw: electrical resistance value of the electric wire 10

Rthw: thermal resistance value of the electric wire 10

In the above Formula (1), the first item expresses a change in temperature caused by the radiation of the heat that has built up in the electric wire 10 up until that point, and the second item expresses a change in temperature caused by the heat generated by the electric wire 10. The above Formula (1) can be rewritten as the following Formula (2).

$$\Delta Tw(n) = (Rthw \times Rw \times I(n-1)^2 - \Delta Tw(n-1)) \times \{1 - \exp(-\Delta t/\tau w)\} + \Delta Tw(n-1) = (A \times I(n-1)^2 - \Delta Tw(n-1)) \times B + \Delta Tw(n-1) \quad (2)$$

Here,

A: constant=Rthw×Rw

B: constant=1−exp(−Δt/τw)

The above constants A and B are stored in ROM, and the control unit 13 calculates the temperature rise value ΔTw(n) at the present current value obtainment timing on the basis of the current value I(n−1) and the temperature rise value ΔTw(n−1). Then, the control unit 13 calculates the temperature T(n) of the electric wire 10 by adding the calculated temperature rise value ΔTw(n) to the surrounding temperature. The temperature of the electric wire 10 is expressed by the following Formula (3). The surrounding temperature is the temperature detected by the temperature detecting unit 16.

$$T(n) = Ta + \Delta Tw(n) \quad (3)$$

Here,

Ta: surrounding temperature

Having finished the process of step S18, the control unit 13 determines whether or not the temperature of the electric wire 10 calculated in step S18 is greater than or equal to a predetermined temperature (step S19). If it is determined that the temperature of the electric wire 10 is less than the predetermined temperature (step S19: NO), the control unit 13 estimates the remaining lifespan of the electric wire 10 on the basis of the current value detected in step S11 (step S20) and stores the remaining lifespan obtained from the estimation (step S21). Specifically, the control unit 13 multiplies a lifespan shortening time corresponding to the temperature of the electric wire 10 calculated in step S18 by an electrification time, and calculates the lifespan shortening time for the electric wire 10 at the present current value obtainment timing.

If the period from the obtainment of the current value to the calculation of the remaining lifespan is Δt, Δt may be used as the electrification time. The control unit 13 then calculates the remaining lifespan by subtracting the shortening time from the remaining lifespan calculated and stored in the previous process.

The remaining lifespan of the electric wire 10 is expressed by the following Formula (4), for example.

$$L(n) = L(n-1) - \alpha(T(n-1)) \times \Delta T \quad (4)$$

Here,

L(n): remaining lifespan of the electric wire 10 at the nth current value obtainment timing α: constant determined by the temperature of the electric wire 10

Next, the control unit 13 determines whether or not the remaining lifespan calculated in step S20 is less than a predetermined threshold (step S22). If it is determined that the remaining lifespan is greater than or equal to the threshold (step S22: NO), the control unit 13 returns the process to step S11. If it is determined that the remaining lifespan is less than the threshold (step S22: YES), the control unit 13 communicates an indication that the remaining lifespan is short to the exterior using the communicating unit 19 (step S23), and returns the process to step S11.

If it is determined in step S19 that the temperature of the electric wire 10 is greater than or equal to the predetermined temperature (step S19: YES), if it is determined in step S12 that reverse current has arisen (step S12: YES), or if it is determined in step S14 that the current values are diverging (step S14: YES), the control unit 13 outputs a cutoff signal to the switch 15 (step S24). As illustrated in FIG. 4, the switch 15 is closed in response to the output of the cutoff signal, current flows through the switch 15 to the drive part 11d, the pyrotechnic cutoff switch 11 activates, and the conductive part 11a is instantly cut off. Cutting off the conductive path between the vehicle-mounted power supply 2 and the load 3 makes it possible to protect the electric wire 10 from being damaged by overcurrent. FIG. 4 illustrates a state in which the vehicle-mounted power supply 2 is connected to the load 3 in reverse.

Next, the control unit 13 obtains the current value from the current detecting unit 14 again (step S25) and determines whether or not the electric wire 10 is conductive on the basis of the obtained current value (step S26). If it is determined that the electric wire 10 is not conductive (step S26: NO), the control unit 13 communicates to the exterior, using the communicating unit 19, an indication that the electric wire 10 has been protected by cutting off the conductive path between the vehicle-mounted power supply 2 and the load 3 (step S27), and ends the processing.

If it is determined that the electric wire 10 is conducting (step S26: YES), the control unit 13 communicates to the exterior, using the communicating unit 19, an indication that the electric wire 10 has not been protected, due to some abnormality (step S28), and ends the processing.

According to the electric wire protection device 1 configured in this manner, the electric wire 10 can be protected by cutting off the conductive path instantly when the vehicle-mounted power supply 2 is connected to the load 3 in reverse. Specifically, the electric wire protection device 1 according to the present embodiment has a circuit configuration in which current flows to the drive part 11d immediately when the vehicle-mounted power supply 2 is connected to the load 3 in reverse, even without control by the control unit 13. Additionally, the pyrotechnic cutoff switch 11 is configured to instantly cut the conductive part 11a using the explosive power of the gunpowder when current flows to the drive part 11d. Accordingly, the conductive path from the vehicle-mounted power supply 2 to the load 3 can be cut off instantly when the vehicle-mounted power supply 2 is connected to the load 3 in reverse, which makes it possible to protect the electric wire 10 from abnormal overcurrent arising when the power supply is connected in reverse.

Additionally, the electric wire protection device 1 includes the switch 15 and the control unit 13, and thus the pyrotechnic cutoff switch 11 can be activated to cut off the conductive path between the vehicle-mounted power supply 2 and the load 3 through active control by the control unit 13.

Specifically, when current is detected flowing from the load 3 to the vehicle-mounted power supply 2, the control unit 13 can close the switch 15 and cut off the conductive path between the vehicle-mounted power supply 2 and the load 3. Accordingly, if the vehicle-mounted power supply 2 is connected to the load 3 in reverse, the electric wire protection device 1 can activate the pyrotechnic cutoff switch 11 and cut off the conductive path between the vehicle-mounted power supply 2 and the load 3 in response to either the current flowing through the diode 12 to the drive part 11d or the current flowing through the switch 15 to the drive part 11d.

Thus the conductive path between the vehicle-mounted power supply 2 and the load 3 can be cut off, and the electric wire 10 can be protected, even if the diode 12 or the control unit 13 has malfunctioned.

Additionally, the control unit 13 can close the switch 15 and cut off the conductive path between the vehicle-mounted power supply 2 and the load 3 when the current value detected by the current detecting unit 14 and the current value obtained from the external current detecting unit 4 are diverging. When these current values are diverging, the current value itself is incorrect, and it is possible that overcurrent has arisen even if the current value is within a normal range. As such, the electric wire protection device 1 can preemptively protect the electric wire 10 by cutting off the conductive path if the current values are diverging.

Furthermore, the control unit 13 calculates the temperature of the electric wire 10 on the basis of the value of the current flowing in the electric wire 10 and the detected surrounding temperature, and closes the switch 15 and cuts off the conductive path between the vehicle-mounted power supply 2 and the load 3 if the calculated temperature is greater than or equal to a threshold. Accordingly, the electric wire protection device 1 can prevent the electric wire 10 from being damaged by current that would bring the electric wire 10 to a temperature greater than or equal to the threshold flowing in the electric wire 10.

Further still, when the conductive path has been cut off, the control unit 13 stops the process of calculating the temperature of the electric wire 10, which makes it possible to eliminate needless processing loads.

Further still, the electric wire protection device 1 calculates the remaining lifespan of the electric wire 10, and can communicate information based on the length of the remaining lifespan obtained from the calculation.

Further still, when the switch 15 has been closed, the electric wire protection device 1 can communicate an indication that the electric wire 10 is being protected.

Specifically, the electric wire protection device 1 can close the switch 15 and confirm that no current is flowing in the electric wire 10, and then communicate to the exterior an indication that the electric wire 10 is being protected.

If, despite the switch 15 having been closed, current is flowing in the electric wire 10, the electric wire protection device 1 can communicate to the exterior an indication that the electric wire 10 is not being protected due to some abnormality.

The invention claimed is:

1. An electric wire protection device comprising:
  a pyrotechnic cutoff switch, provided partway along an electric wire connecting a load to a vehicle-mounted power supply connected to a reference potential, the pyrotechnic cutoff switch including a conductive part that conducts current between the vehicle-mounted power supply and the load, a cutting blade that cuts the conductive part, a drive part that propels the cutting blade in a direction that cuts the conductive part using the explosive power of gunpowder, and two terminals that input and output current that drives the drive part;
  a conductive wire, one end of the conductive wire being connected to the electric wire and another end of the conductive wire being connected to one of the terminals;
  a diode, an anode of the diode being connected to the reference potential and a cathode of the diode being connected to the other of the terminals;
  a switch, one end of the switch being connected to the other of the terminals and another end of the switch being connected to the reference potential;
  a control unit that opens and closes the switch;
  a current detecting unit that detects current flowing in the electric wire; and
  a temperature detecting unit that detects a surrounding temperature,
  wherein the control unit:
  includes a temperature calculating unit that calculates a temperature of the electric wire on the basis of the value of the current detected by the current detecting unit and the surrounding temperature detected by the temperature detecting unit; and
  a comparing unit that compares the temperature calculated by the temperature calculating unit with a threshold, and wherein the control unit closes the switch in the case where the temperature is greater than or equal to the threshold;
  a timer unit that measures a time for which current flows in the electric wire;
  a remaining lifespan calculating unit that calculates a remaining lifespan of the electric wire on the basis of the temperature calculated by the temperature calculating unit and the time measured by the timer unit; and
  a remaining lifespan communicating unit that communicates information based on a length of the remaining lifespan calculated by the remaining lifespan calculating unit.

2. The electric wire protection device according to claim 1, wherein the control unit closes the switch in the case where the current detecting unit has detected current flowing from the load toward the vehicle-mounted power supply.

3. The electric wire protection device according to claim 1, further comprising:
  a communicating unit that communicates predetermined information to an exterior in the case where the switch has been closed.

4. The electric wire protection device according to claim 2, further comprising:
  a communicating unit that communicates first predetermined information to an exterior in the case where the value of the current detected by the current detecting unit after the switch has been closed is less than a predetermined current value, and communicates second predetermined information to the exterior in the case where the value of the current is greater than or equal to the predetermined current value.

5. An electric wire protection device comprising:
  a pyrotechnic cutoff switch, provided partway along an electric wire connecting a load to a vehicle-mounted power supply connected to a reference potential, the pyrotechnic cutoff switch including a conductive part that conducts current between the vehicle-mounted power supply and the load, a cutting blade that cuts the conductive part, a drive part that propels the cutting blade in a direction that cuts the conductive part using the explosive power of gunpowder, and two terminals that input and output current that drives the drive part;
  a conductive wire, one end of the conductive wire being connected to the electric wire and another end of the conductive wire being connected to one of the terminals;
  a diode, an anode of the diode being connected to the reference potential and a cathode of the diode being connected to the other of the terminals;
  a switch, one end of the switch being connected to the other of the terminals and another end of the switch being connected to the reference potential;
  a control unit that opens and closes the switch; and
  a current detecting unit that detects current flowing in the electric wire, wherein the control unit closes the switch in the case where the current detecting unit has detected current flowing from the load toward the vehicle-mounted power supply; and a communicating unit that communicates first predetermined information to an exterior in the case where the value of the current detected by the current detecting unit after the switch has been closed is less than a predetermined current value, and communicates second predetermined information to the exterior in the case where the value of the current is greater than or equal to the predetermined current value.

6. The electric wire protection device according to claim 5 further comprising:

a temperature detecting unit that detects a surrounding temperature, wherein the control unit:

includes a temperature calculating unit that calculates a temperature of the electric wire on the basis of the value of the current detected by the current detecting unit and the surrounding temperature detected by the temperature detecting unit; and a comparing unit that compares the temperature calculated by the temperature calculating unit with a threshold, and closes the switch in the case where the temperature is greater than or equal to the threshold.

7. The electric wire protection device according to claim 1, wherein the control unit stops the calculation of the temperature in the case where the switch has been closed.

8. The electric wire protection device according to claim 1, further comprising:

an obtaining unit that obtains, from an external device, information of a value of current flowing in the electric wire, wherein the control unit:

includes a determining unit that determines whether or not a difference between the value of the current detected by the current detecting unit and the value of the current obtained by the obtaining unit is greater than or equal to a predetermined value; and closes the switch in the case where the determining unit has determined that the difference is greater than or equal to the predetermined value.

9. The electric wire protection device according to claim 2, wherein the control unit stops the calculation of the temperature in the case where the switch has been closed.

10. The electric wire protection device according to claim 3, wherein the control unit stops the calculation of the temperature in the case where the switch has been closed.

11. The electric wire protection device according to claim 4, wherein the control unit stops the calculation of the temperature in the case where the switch has been closed.

12. The electric wire protection device according to claim 6, wherein the control unit stops the calculation of the temperature in the case where the switch has been closed.

13. The electric wire protection device according to claim 2, further comprising:

an obtaining unit that obtains, from an external device, information of a value of current flowing in the electric wire, wherein the control unit:

includes a determining unit that determines whether or not a difference between the value of the current detected by the current detecting unit and the value of the current obtained by the obtaining unit is greater than or equal to a predetermined value; and closes the switch in the case where the determining unit has determined that the difference is greater than or equal to the predetermined value.

14. The electric wire protection device according to claim 3, further comprising:

an obtaining unit that obtains, from an external device, information of a value of current flowing in the electric wire, wherein the control unit:

includes a determining unit that determines whether or not a difference between the value of the current detected by the current detecting unit and the value of the current obtained by the obtaining unit is greater than or equal to a predetermined value; and closes the switch in the case where the determining unit has determined that the difference is greater than or equal to the predetermined value.

15. The electric wire protection device according to claim 4, further comprising:

an obtaining unit that obtains, from an external device, information of a value of current flowing in the electric wire, wherein the control unit:

includes a determining unit that determines whether or not a difference between the value of the current detected by the current detecting unit and the value of the current obtained by the obtaining unit is greater than or equal to a predetermined value; and closes the switch in the case where the determining unit has determined that the difference is greater than or equal to the predetermined value.

16. The electric wire protection device according to claim 5, further comprising:

an obtaining unit that obtains, from an external device, information of a value of current flowing in the electric wire, wherein the control unit:

includes a determining unit that determines whether or not a difference between the value of the current detected by the current detecting unit and the value of the current obtained by the obtaining unit is greater than or equal to a predetermined value; and closes the switch in the case where the determining unit has determined that the difference is greater than or equal to the predetermined value.

17. The electric wire protection device according to claim 6, further comprising:

an obtaining unit that obtains, from an external device, information of a value of current flowing in the electric wire, wherein the control unit:

includes a determining unit that determines whether or not a difference between the value of the current detected by the current detecting unit and the value of the current obtained by the obtaining unit is greater than or equal to a predetermined value; and closes the switch in the case where the determining unit has determined that the difference is greater than or equal to the predetermined value.

18. The electric wire protection device according to claim 7, further comprising:

an obtaining unit that obtains, from an external device, information of a value of current flowing in the electric wire, wherein the control unit:

includes a determining unit that determines whether or not a difference between the value of the current detected by the current detecting unit and the value of the current obtained by the obtaining unit is greater than or equal to a predetermined value; and closes the switch in the case where the determining unit has determined that the difference is greater than or equal to the predetermined value.

\* \* \* \* \*